US008441820B2

(12) United States Patent
Shen et al.

(10) Patent No.: US 8,441,820 B2
(45) Date of Patent: May 14, 2013

(54) DC-LINK VOLTAGE BALANCING SYSTEM AND METHOD FOR MULTILEVEL CONVERTERS

(75) Inventors: Jie Shen, Ingolstadt (DE); Stefan Schroeder, Munich (DE); Robert Roesner, Unterfoehring (DE)

(73) Assignee: General Electric Company, Niskayuna, NY (US)

( * ) Notice: Subject to any disclaimer, the term of this patent is extended or adjusted under 35 U.S.C. 154(b) by 413 days.

(21) Appl. No.: 12/893,015

(22) Filed: Sep. 29, 2010

(65) Prior Publication Data

US 2011/0141786 A1 Jun. 16, 2011

(51) Int. Cl.
*H02H 7/122* (2006.01)
*H02M 7/537* (2006.01)

(52) U.S. Cl.
USPC ........................................ 363/56.01; 363/131

(58) Field of Classification Search .................... 363/55, 363/56.01, 56.02, 97, 98, 131, 132
See application file for complete search history.

(56) References Cited

U.S. PATENT DOCUMENTS

| 5,355,297 | A | 10/1994 | Kawabata et al. | |
| 5,852,558 | A | 12/1998 | Julian et al. | |
| 6,337,804 | B1 * | 1/2002 | Kea et al. | 363/132 |
| 7,196,919 | B2 | 3/2007 | Fu et al. | |
| 7,495,938 | B2 | 2/2009 | Wu et al. | |
| 7,573,732 | B2 | 8/2009 | Teichmann et al. | |
| 8,144,490 | B2 * | 3/2012 | El-Barbari et al. | 363/43 |
| 8,228,695 | B2 * | 7/2012 | Roesner et al. | 363/56.01 |
| 2012/0161858 | A1 * | 6/2012 | Permuy et al. | 327/536 |

OTHER PUBLICATIONS

Hideo et al.; "A circulating current control scheme for multiple three-level NPC inverter systems"; May 11, 2001, pp. 38-48, vol. 136, Issue 2.
Lee et al.; "The Carrier-based PWM Method for Voltage Balance of Flying Capacitor Multilevel Inverter"; Power Electronics Specialists Conference, 2001. PESC. 2001 IEEE 32nd Annual; 2001, pp. 126-131 vol. 1.
Bendre et al.; "Comparative Evaluation of Modulation Algorithms for Neutral-Point-Clamped Converters"; Industry Applications, IEEE Transactions; Mar./Apr. 2005, pp. 634-643, vol. 41, Issue 2.
Tallam et al.; "A carrier-based PWM scheme for neutral-point voltage balancing in three-level inverters"; Industry Applications, IEEE Transactions; Nov.-Dec. 2005, pp. 1734-1743, vol. 41, Issue 6.
Calle et al.; "Three-Level Three-Phase Neutral-Point-Clamped Back-to-Back Converter Applied to a Wind Emulator"; Power Electronics and Applications, 2009. EPE '09; Sep. 2009, pp. 1-10.

* cited by examiner

*Primary Examiner* — Matthew Nguyen
(74) *Attorney, Agent, or Firm* — Ann M. Agosti (57) ABSTRACT

A control system for a multilevel converter includes a differential mode current regulator, a neutral point (NP) controller and a PWM controller for generating switching pulses for the multilevel converter. The differential mode current regulator generates reference voltage command signals based on a difference between reference current command signals and actual current command signals, and the NP controller determines a modified neutral point current signal in response to a DC link voltage unbalance. The NP controller utilizes the modified neutral point current signal to generate a common mode reference voltage signal. The switching pulses are generated by the PWM controller based on the reference voltage command signals and the common mode reference voltage signal.

20 Claims, 8 Drawing Sheets

DC-LINK VOLTAGE BALANCING SYSTEM AND METHOD FOR MULTILEVEL CONVERTERS

BACKGROUND

This invention relates to multilevel converters and more specifically to a system and method for DC link voltage balancing in multilevel converters.

Multilevel converters are generally used in high power industrial applications such as variable speed drive (VSD) systems or in energy conversion applications such as a solar (or photovoltaic) power generation systems, wind turbine generators and marine and hydrokinetic power generation systems. One example of a multi-level converter is a neutral point clamped (NPC) converter. A three level converter, for example, typically includes two capacitor voltages in series with a center tap as the neutral and two phase legs each comprising two pairs of switching devices in series. In one embodiment, each switching device comprises an anti-parallel connection of a unidirectional electronic switching device, such as an insulated gate bipolar transistor or an insulated gate commutated thyristor, and a diode, such as a free-wheeling diode.

DC link voltage balancing is a challenge when operating three level neutral clamped converters (NPC). DC link voltage unbalance may overstress the capacitors and switching devices and cause over voltage and under voltage trips during the operation of the converter. In severe DC link voltage unbalance conditions, one capacitor may become fully charged to the full DC-link voltage such that stress on the capacitor and the switching devices is doubled and the output waveforms become two level rather than three-level. DC link voltage unbalance also causes an increase in output voltage total harmonic distortion (THD) and may cause the control loop to become unstable.

One of the methods of compensating DC link voltage unbalance is utilizing measured DC-link voltages for pulse width modulation (PWM) control of the three level converter. This method, however, includes additional expense, does not compensate for steady-error in DC link voltage, and also results in high THD in the output voltage and injects active $2^{nd}$ harmonic current at AC side. Another method of compensating DC link voltage unbalance is to use zero sequence voltage or DC bias voltage injection. However, this method also has high THD in the output voltage at some operation points and becomes unstable at low power factors.

Therefore, it is desirable to provide a method and a system that will address the foregoing issues.

BRIEF DESCRIPTION

In accordance with an embodiment of the present invention, a control system for controlling a multilevel converter is provided. The control system includes a differential mode current regulator to generate reference voltage command signals based on a difference between reference current command signals and actual current command signals. The system also includes a neutral point (NP) controller to determine a modified neutral point current signal in response to a DC link voltage unbalance and to use the modified neutral point current signal to generate a common mode reference voltage signal. The system further includes a PWM controller to generate switching pulses for the multilevel converter based on the reference voltage command signals and the common mode reference voltage signals.

In accordance with another embodiment of the present invention, a method of controlling a multilevel converter is provided. The method includes (a) generating reference voltage command signals based on a difference between reference current command signals and actual current command signals. The method also includes (b) in response to a voltage unbalance on a DC link of the multi-level converter, (i) using the reference voltage command signals and reference current command signals for generating a modified neutral point current signal to compensate for the DC link voltage unbalance, (ii) using the modified neutral point current signal for generating a common mode reference voltage signal; and (iii) generating switching pulses for the multilevel converter based on summation of reference voltage command signals and the common mode reference voltage signal.

In accordance with yet another embodiment of the present invention, a multilevel converter including a plurality of phase legs each having at least two inner switching devices, at least two outer switching devices, at least two clamping diodes and a split DC link is provided. The multilevel converter also includes a control system for controlling the multilevel converter. The control system includes a differential mode current regulator to generate reference voltage command signals based on a difference between reference current command signals and actual current command signals. The system also includes a neutral point (NP) controller to determine a modified neutral point current signal in response to a DC link voltage unbalance and to use the modified neutral point current signal to generate a common mode reference voltage signal. The system further includes a PWM controller to generate switching pulses for the multilevel converter based on the reference voltage command signals and the common mode reference voltage signals.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
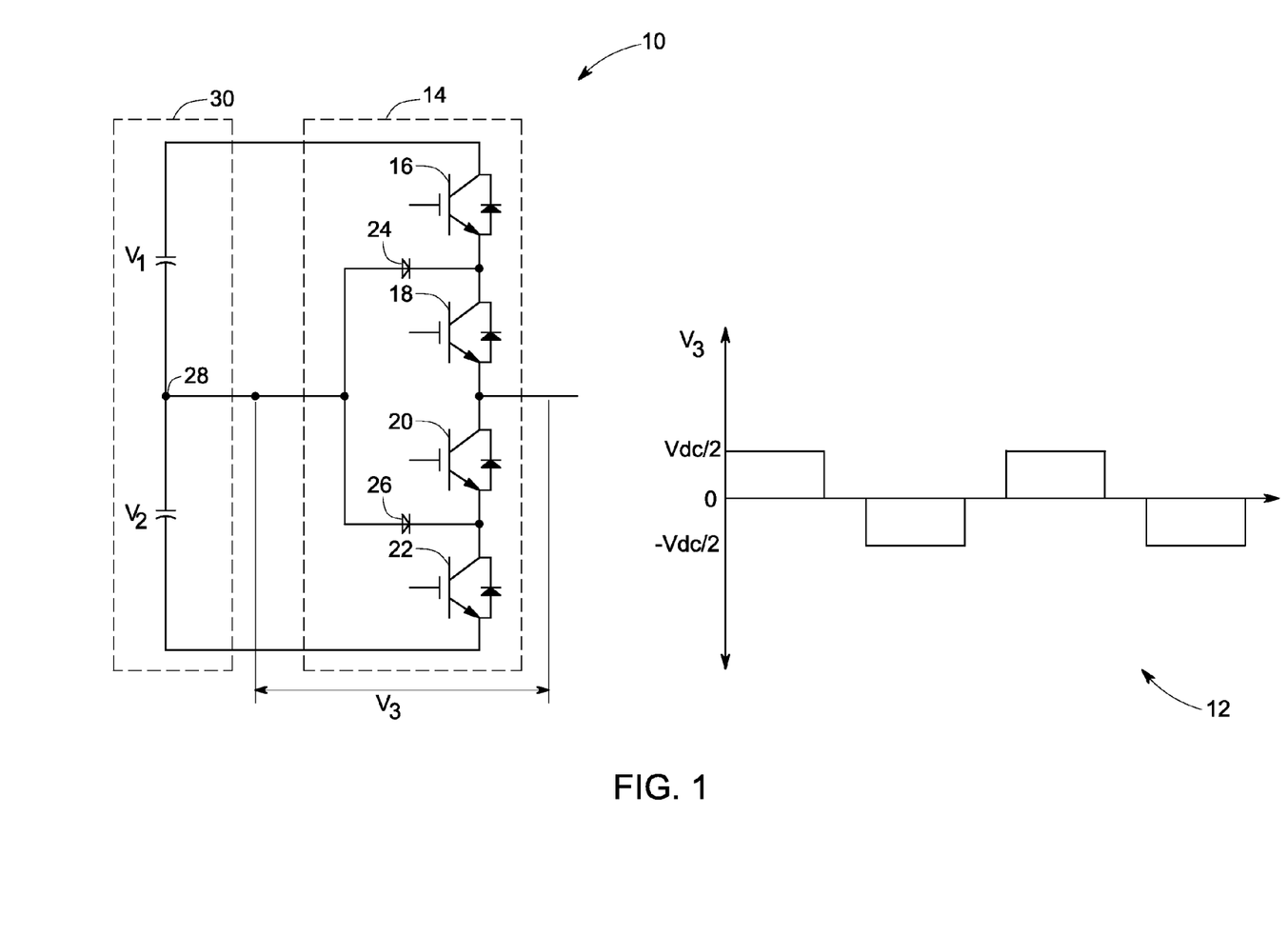
FIG. 1 is a circuit diagram of one leg of a conventional neutral point clamped multilevel converter and its output waveform.

FIG. 1 illustrates a schematic 10 of one leg or one phase of a conventional neutral point clamped (NPC) or diode clamped three level converter and its output waveform 12.

One leg 14 of the three-level converter includes four switching devices 16, 18, 20, and 22 and two clamping diodes 24 and 26. Input voltages V1 and V2 are controlled to each have a voltage equal to Vdc/2, where Vdc is the total DC link voltage. Voltage V3 is the phase A output voltage measured with respect to a center point or a neutral point 28 of DC link 30. Switching device 16 is complementary to switching device 20 so that, when switching device 16 is gated on, switching device 20 is gated off and vice versa. Similarly, switching devices 18 and 22 are complementary.

In operation, each leg of the NPC three level converter has three switching stages P, O, and N respectively. The three switching stages and the respective output voltages are given in following table:

TABLE 1

| Switching Stage | Switching Device 16 | Switching Device 18 | Switching Device 20 | Switching Device 22 | Voltage V3 |
|---|---|---|---|---|---|
| P | ON | ON | OFF | OFF | +Vdc/2 |
| O | OFF | ON | ON | OFF | 0 |
| N | OFF | OFF | ON | ON | −Vdc/2 |

In the first switching stage P, switching devices 16 and 18 are turned on and switching devices 20 and 22 are turned off. Assuming a stable operation, V1=V2=Vdc/2, and V3 becomes Vdc/2. In the second switching stage O, switching devices 18 and 20 are turned on while switching devices 16 and 22 are turned off. In this stage, V3 is equal to zero. In the third switching stage N, switching devices 16 and 18 are turned off whereas switching devices 20 and 22 are turned on. This results in V3 becoming −Vdc/2 as shown in a waveform 12. Thus, it can be seen that the phase voltage V3 has three levels Vdc/2, −Vdc/2, and 0. When all three legs of the NPC three-phase converter are combined, then the resulting line to line voltages have five levels namely Vdc, Vdc/2, 0, −Vdc/2 and −Vdc.

The converter leg 14 of FIG. 1 may be modified so as to increase the number of voltage levels to any level depending on the circuit topology and number of switching devices and diodes in the circuit. As the number of levels in the converter increases, the output waveform of the converter approaches a pure sine wave, resulting in lower harmonics in the output voltage. In general, the number of switching stages can be higher than three as switching devices may not be gated on if the corresponding free-wheeling diode is going to conduct current. This operation mode does not affect the number of levels of the output phase voltage.

Figure 2:
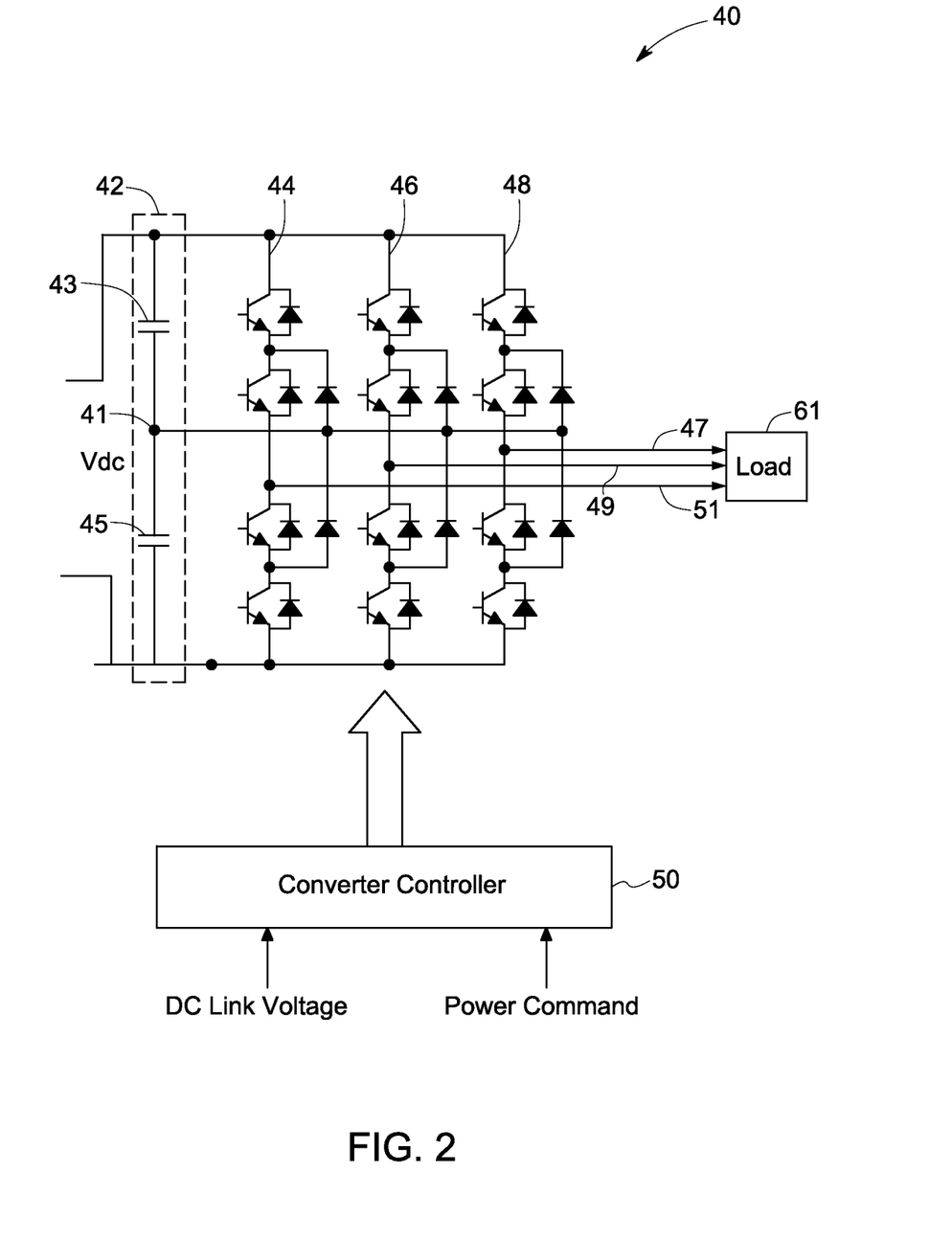
FIG. 2 is a circuit diagram of a three phase three level converter for use in accordance with an embodiment of the present invention.

FIG. 2 illustrates a schematic 40 of a three phase three level converter for use in accordance with an embodiment of the present invention. The converter 40 includes a split DC link 42 with a neutral point 41 and capacitors 43 and 45 and three switching legs 44, 46, and 48 with output terminals 47, 49, and 51 respectively (for phases a, b, and c). A three phase load 61 is connected across the three phase output terminals 47, 49, and 51. A converter controller 50 provides switching pulse commands to switching devices of the switching legs 44, 46, and 48 based on DC link voltage and power signals. As described earlier, the output line voltages at output terminals 47, 49, and 51 will have five levels, namely Vdc, Vdc/2, 0, −Vdc/2 and −Vdc.

Figure 3:
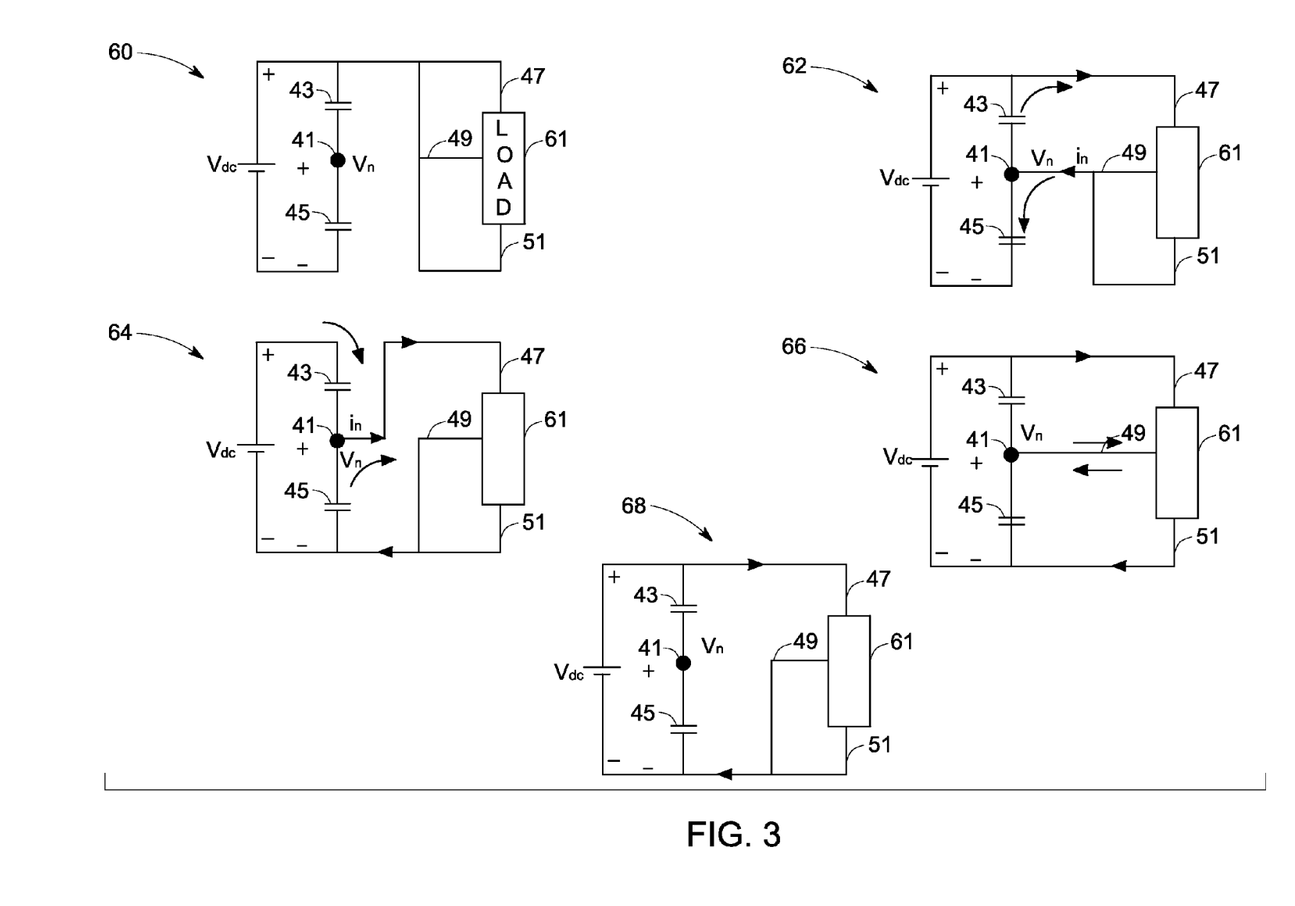
FIG. 3 is a schematic representation of different load connections at different switching states for the embodiment of FIG. 2.

FIG. 3 shows the effect of switching states on neutral point voltage deviation. When the converter is operated with a switching state [PPP], in other words, when all legs are in a P switching state, the upper two switching devices (FIG. 2) in each of the three converter legs are turned on, connecting the load terminals 47, 49, and 51 to the positive DC bus as shown in circuit 60. Since the neutral point 41 is left unconnected, this switching state does not affect neutral point voltage Vn. Circuit 62 shows the converter operation with a switching state POO (one leg with P switching state and the other two legs with O switching state as described in Table 1). In this state the three-phase load is connected between the positive DC bus and neutral point, and the neutral current $i_n$ flows in through the neutral point causing Vn to increase. In contrast, the switching state ONN causes Vn to decrease as shown in circuit 64. For switching state PON in circuit 66, terminals 47, 49 and 51 are connected to the positive DC bus, the neutral point, and the negative bus, respectively. In this state, depending on the load current, the neutral-point voltage Vn may rise or drop. In switching state PNN, as shown in circuit 68, the terminals are connected to the positive and negative DC buses. The neutral point is left unconnected and thus the neutral point voltage is not affected. Thus, depending on the switching states and the load current, the neutral point voltage varies and may not remain balanced at Vdc/2.

Figure 4:
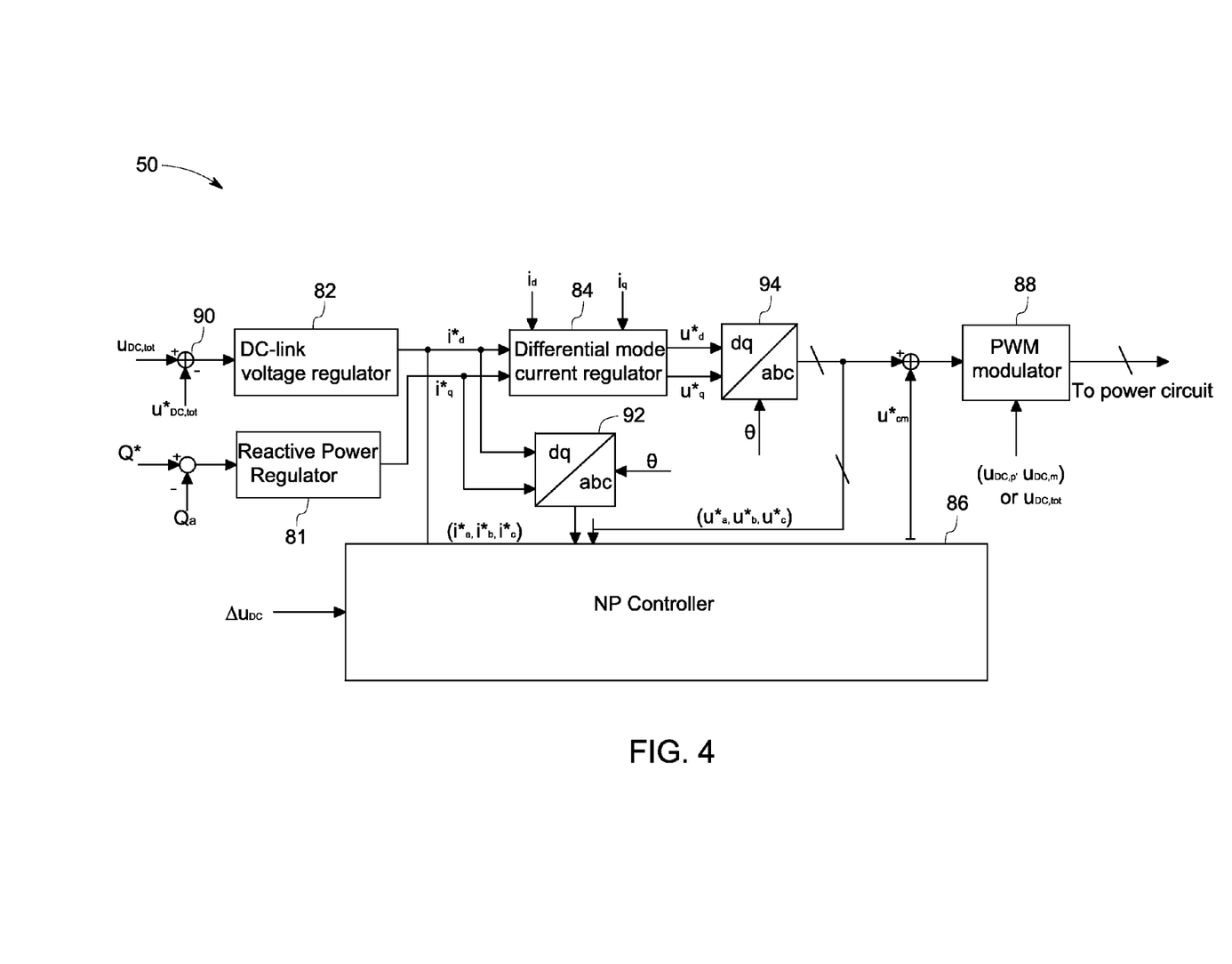
FIG. 4 is a detailed block diagram of a converter controller in accordance with an embodiment of the present invention.

FIG. 4 shows a detailed block diagram of a converter controller 50 for use in the configuration of FIG. 2 in accordance with one embodiment of the present invention. Controller 50 includes a DC link voltage regulator 82, a differential mode current regulator 84, a neutral point (NP) controller 86 and a PWM controller 88. DC link voltage regulator 82, generates a d-domain reference current command signal $i^*_d$ based on an error signal which is a difference between the reference or the desired total DC link voltage $u^*_{DC,tot}$ and the actual total DC link voltage $u_{DC,tot}$ as obtained by a comparator 90, for example. In one embodiment, DC link voltage regulator 82 comprises a proportional-integral (PI) regulator. In one embodiment, a q-domain reference current command signal $i^*_q$ may be generated by a reactive power regulator 81 based on a difference between a desired amount of reactive power or a reference reactive power Q* and an actual reactive power Qa. Differential mode current regulator 84 receives d-q domain reference current command signals $i^*_d$, $i^*_q$ and d-q domain actual current command signals $i_d$, $i_q$ and uses those signals to generate d-q domain reference voltage command signals $u^*_d$ and $u^*_q$ based on the difference between the reference and the actual current command signals. In one embodiment, actual current command signals $i_d$, $i_q$ are determined from measured three phase a-b-c domain load currents $i_a$, $i_b$, $i_c$ by transforming them into d-q domain currents. Differential mode current regulator includes two PI regulators. One for d-domain currents $i^*_d$ and $i_d$ for generating d domain reference voltage command signal $u^*_d$ and the other one for q-domain currents $i^*_q$ and $i_q$ for generating q domain reference voltage command signal $u^*_q$.

As further shown in FIG. 4, d-q to a-b-c domain transformation matrices 92 and 94 may be used to transform d-q domain reference current command signals $i^*_d$, $i^*_q$ and d-q domain reference voltage command signals $u^*_d$, $u^*_q$ into the a-b-c domain reference current command signals $i^*_a$, $i^*_b$, $i^*_c$ and a-b-c domain reference voltage command signals $u^*_a$, $u^*_b$, $u^*_c$, respectively, based on a phase angle θ. The phase angle θ is generated by a phase locked loop (PLL) (not shown) based on three phase load voltages or grid voltages if the converter is connected to the power grid. NP controller 86 generates a common mode reference voltage signal $u^*_{cm}$ for compensating the DC link voltage unbalance. The common mode reference voltage signal $u^*_{cm}$ is then further added to the a-b-c domain reference voltage command signals $u^*_a$, $u^*_b$, $u^*_c$ before providing the combined voltage signal to PWM controller 88. The resultant signal of addition of $u^*_a$, $u^*_b$, $u^*_c$ and $u^*_{cm}$ is thus used by the multilevel converter controller to balance the neutral point voltage.

NP controller 86 generates the common mode reference voltage signal $u^*_{cm}$ based on d-domain reference current command signal $i^*_d$, a-b-c domain reference current command signals $i^*_a$, $i^*_b$, $i^*_c$, a-b-c domain reference voltage command signals $u^*_a$, $u^*_b$, $u^*_c$ and differential DC link voltage signal $\Delta u_{dc}$ as discussed below with respect to FIG. 5. In one embodiment, NP controller 86 may use measured load current signals $i_a$, $i_b$, $i_c$ rather than reference current command signals $i^*_a$, $i^*_b$, $i^*_c$ for generating the common mode reference voltage signal.

PWM controller 88 also receives measured half DC-link voltages i.e., the top capacitor voltage or the positive bus DC link voltage with respect to neutral point $u_{DC,p}$ and the bottom capacitor voltage or the negative bus DC link voltage with respect to neutral point $u_{DC,m}$ and generates three phase duty cycle signals $DC_{a\ldots c}$ for the three level converter given by:

$$DC_{a\ldots c} = \begin{cases} \dfrac{u^*a\ldots c}{u_{DC,p}} & \text{for } u^*_{a\ldots c} \geq 0 \\ -\dfrac{u^*a\ldots c}{u_{DC,m}} & \text{for } u^*_{a\ldots c} < 0 \end{cases} \quad (1)$$

The above generated three phase duty cycles are then utilized to produce PWM pulses for individual switching devices of the multilevel converter. In one embodiment, a sine triangular PWM or a space vector PWM is used for generating the PWM pulses.

Figure 5:
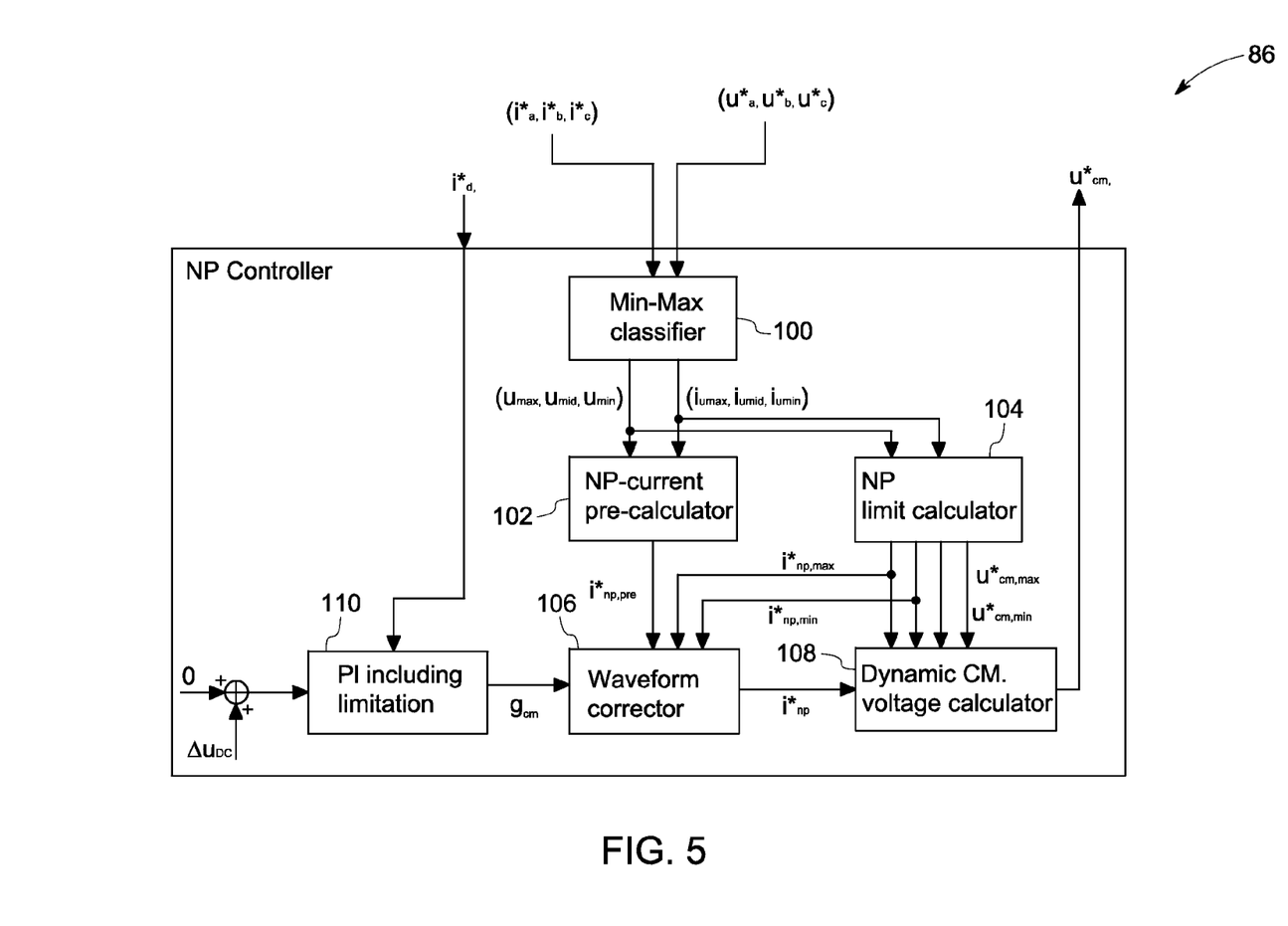
FIG. 5 is detailed block diagram of a neutral point (NP) controller in accordance with an embodiment of the present invention.

FIG. 5 shows a detailed block diagram of the NP controller 86 of FIG. 4. NP controller 86 includes a MM-Max classifier 100 to determine instantaneous minimum, maximum, and medium current and voltage values, $i_{u\,min}$, $i_{u\,max}$, $i_{umid}$, and $u_{min}$, $u_{max}$, $u_{mid}$ of the a-b-c domain reference current $i^*_a$, $i^*_b$, $i^*_c$ and reference voltage $u^*_a$, $u^*_b$, $u^*_c$ signals respectively. For example, minimum, maximum, and medium values for a-b-c domain reference voltages may be −147V, 147V and 0V at a particular instant. The instantaneous minimum, maximum, and medium current and voltage values are then provided to a NP current pre-calculator 102 and a NP limit calculator 104.

NP current pre-calculator determines the current that flows into the neutral point if no additional common mode reference voltage is injected to the reference voltage command signals. In other words, it determines the present neutral point current without disturbing the common mode reference that is being added to the a-b-c domain reference voltage command signals. The neutral point current signal $i^*_{np,pre}$ is calculated by following equation:

$$i^*_{np,pre} = \begin{cases} \dfrac{u_{max}\cdot i_{u\,max} + u_{mid}\cdot i_{umid}}{u_{DC,p}} + \dfrac{u_{min}\cdot i_{u\,min}}{u_{DC,m}} & \text{for } u_{mid} \geq 0 \\ \dfrac{u_{max}\cdot i_{u\,max}}{u_{DC,p}} + \dfrac{u_{mid}\cdot i_{u\,mid} + u_{min}\cdot i_{u\,min}}{u_{DC,m}} & \text{for } u_{mid} < 0 \end{cases} \quad (2)$$

The average value of neutral point current $i^*_{np,pre}$ over a time period becomes zero if it is not modified.

NP limit calculator 104 determines minimum and maximum limits for neutral point current signal $i^*_{np,pre}$, and common mode reference voltage signal $u^*_{cm}$. The limits are identified based on several constraints. For example, the amplitude of the common mode reference voltage is limited by the modulation index (MI) of the multilevel converter which indicates the peak line-to-line output voltage that can be generated by the multilevel converter and is generally lower than the total DC-link voltage at any instant. In one embodiment, the maximum and minimum limits $u^*_{cm,max}$ and $u^*_{cm,min}$ for the common mode reference voltage are given by:

$$u^*_{cm,min} = \max(u_{max} - u^*_{DC,p}\cdot DC_{max}, (1-DC_{max})\cdot u_{DC,p} + u_{min}) \quad (3)$$

$$u^*_{cm,max} = \min(u_{min} - u^*_{DC,m}\cdot DC_{max}, (1-DC_{max})\cdot u_{DC,m} + u_{max}) \quad (4)$$

where $DC_{max}$ is a constant which indicates maximum duty cycle that can be achieved in the circuit and depends on circuit design. Similarly, maximum, medium, and minimum limits $i^*_{np,max}$, $i^*_{np,mid}$, and $i^*_{np,min}$ for the neutral point current signal may be given by $$i^*_{np,I\ldots III} = \begin{cases} \dfrac{(u_{max}-u_{cm,I\ldots III})\cdot i_{u\,max} + (u_{mid}-u_{cm,I\ldots III})\cdot i_{umid}}{u_{DC,p}} + \\ \dfrac{(u_{min}-u_{cm,I\ldots III})\cdot i_{u\,min}}{u_{DC,m}} \quad \text{for } (u_{mid}-u_{cm,I\ldots III}) \geq 0 \quad (5) \\ \dfrac{(u_{max}-u_{cm,I\ldots III})\cdot i_{u\,max}}{u_{DC,p}} + \\ \dfrac{(u_{mid}-u_{cm,I\ldots III})\cdot i_{u\,mid} + (u_{min}-u_{cm,I\ldots III})\cdot i_{u\,min}}{u_{DC,m}} \\ \text{for } (u_{mid}-u_{cm,I\ldots III}) < 0 \quad (6) \end{cases}$$

where I, II and III refers to min, mid and max respectively. The maximum and minimum current limit and voltage limit signals are then provided to a waveform corrector 106 and a dynamic common mode (CM) voltage regulator 108.

A proportional-integral (PI) regulator 110 generates a DC control signal $g_{cm}$ based on a differential DC link voltage signal $\Delta u_{dc}$ after subtracting it from zero to indicate whether the differential DC link voltage is above or below zero. The differential DC link voltage is a difference between top capacitor voltage and the bottom capacitor voltage of the DC link. In an optional embodiment, d domain reference current command signal $i^*_d$ is used as a factor that could be used to modify the PI regulator 110 gain. The resulting DC control signal $g_{cm}$ will have values between +1 and −1 and is utilized by waveform corrector 106 along with maximum and minimum current limit signals for modifying the neutral point current signal $i^*_{np,pre}$ determined in equation 2 from NP current pre-calculator 102. If no DC-link unbalance is detected, that is, if $\Delta u_{dc}=0$ or $g_{cm}=0$, then the neutral point current signal $i^*_{np,pre}$ is not changed. Otherwise, the neutral point current signal $i^*_{np,pre}$ will be modified and the modified neutral point current signal $i^*_{np}$ will be given as:

$$i^*_{np} = \begin{cases} i^*_{np,pre} + g_{cm}\cdot(i^*_{np,max} - i^*_{np,pre}) & \text{for } g_{cm} > 0 \\ i^*_{np,pre} & \text{for } g_{cm} = 0 \\ i^*_{np,pre} - g_{cm}\cdot(i^*_{np,min} - i^*_{np,pre}) & \text{for } g_{cm} < 0 \end{cases} \quad (7)$$

It can be seen from the above equation that if DC control signal $g_{cm}$ is zero (if there is no voltage unbalance) then the neutral point current signal need not be modified and hence it remains $i^*_{np,pre}$. However, if $g_{cm}$ is not zero, then the current $i^*_{np,pre}$ is modified or regulated based on the DC control signal $g_{cm}$. Further, it is ensured that the modified current signal $i^*_{np}$ is within the maximum and minimum limits $i^*_{np,max}$ and $i^*_{np,min}$ determined in equations 5 and 6 respectively.

Dynamic CM voltage regulator 108 generates the common mode reference voltage signal $u^*_{cm}$ for compensating the DC link voltage unbalance based on the modified current signal $i^*_{np}$. In one embodiment, the dynamic CM voltage regulator 108 includes a look-up table that provides the required CM reference voltage magnitude according to the modified current signal. At a particular instant, for a given current signal $i^*_{np}$, the look up table will have voltage values within the maximum and minimum limit signals $u^*_{cm,\,max}$ and $u^*_{cm,\,min}$ determined in equations 3 and 4 respectively at that instant. The voltage values in the look up table vary depending on the load power factor. The curve between voltage values and the respective current values in the lookup table for a given power factor is partly linear and in most cases there is only one solution available. For example, at a load power factor of 0.9 the curve will be a flat line. In certain cases, there may be two solutions available. In these cases, the solution with lower amplitude is chosen as described in more detail in FIG. 7.

Figure 6:
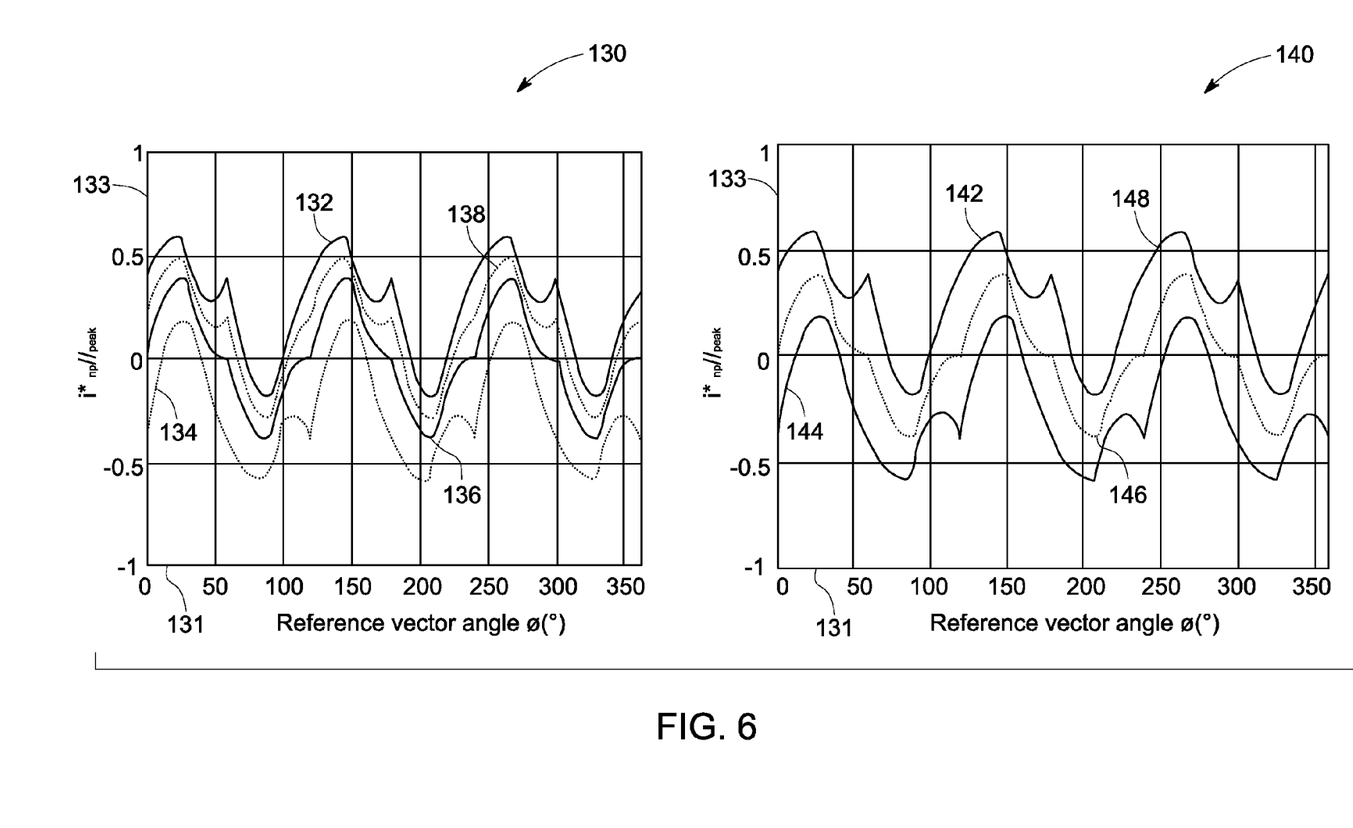
FIG. 6 is a graphical representation of an NPC current simulation plots.

FIG. 6 shows neutral point current simulation plots 130 and 140 for two different power factors. Plot 130 is for a power factor of 0.9 and the DC control signal $g_{cm}=0.5$, whereas plot 140 is for same power factor but for $g_{cm}=1$. In both plots 130 and 140 horizontal axis 131 represents a reference vector angle in degree which is representative of time, and vertical axis 133 represents normalized current values in amperes. Curves 132 and 142 represent maximum neutral point current signals $i^*_{np,\,max}$ and curves 134 and 144 represent minimum neutral point current signals $i^*_{np,\,min}$. Similarly, curves 136 and 146 represent neutral point current signals $i^*_{np,\,pre}$ and curves 138 and 148 represent modified neutral point current signals $i^*_{np}$ respectively. It can be seen from plot 140 that when $g_{cm}=1$, $i^*_{np,\,pre}=i^*_{np,\,max}$ as given by equation 7 and thus, the curves 142 and 148 are overlapped.

Figure 7:
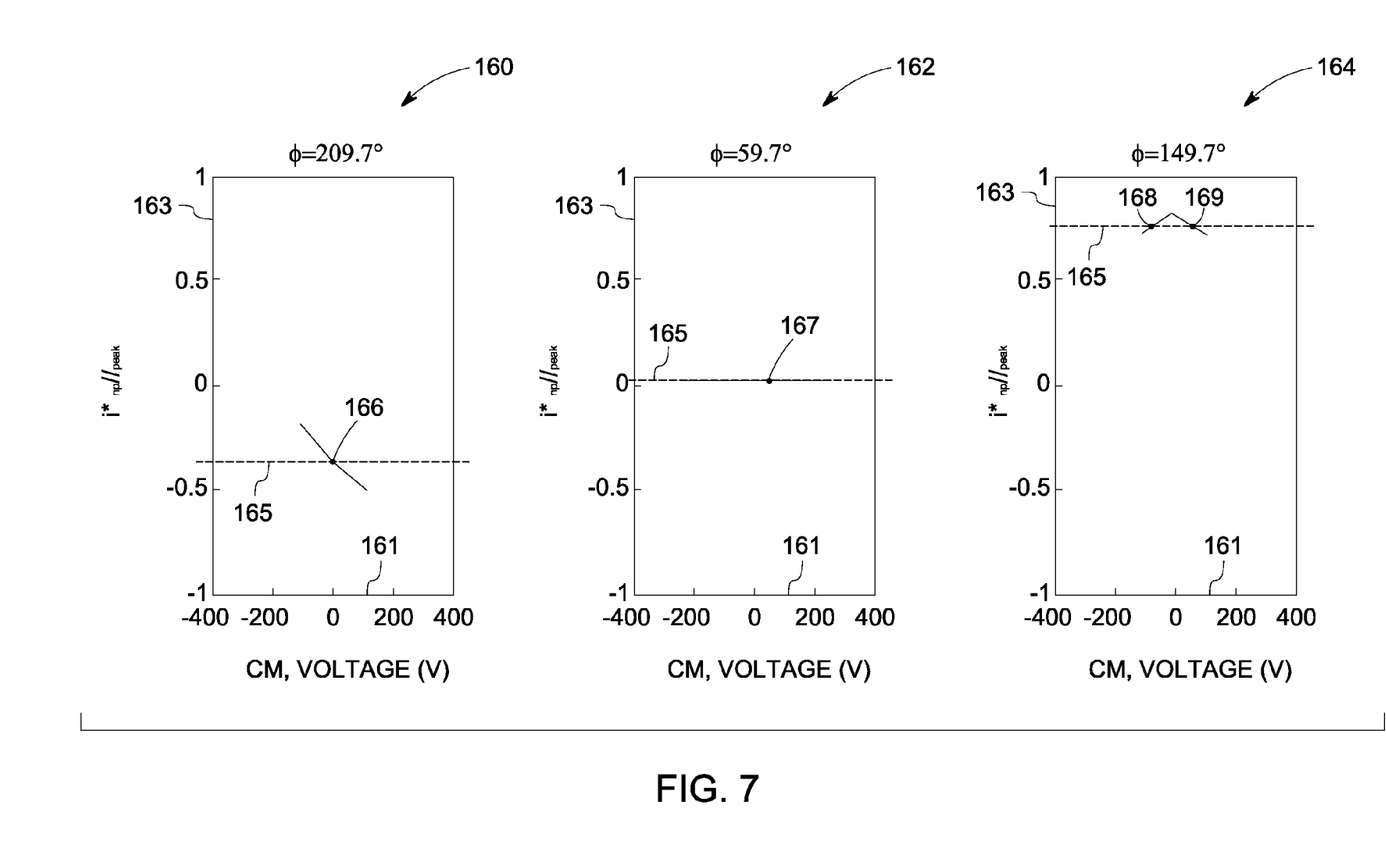
FIG. 7 is a graphical representation of plots for determining common voltage signal.

FIG. 7 shows simulation plots 160, 162 and 164 for determining common mode voltage for three different power factors in accordance with an embodiment of the present invention. In all plots 160, 162 and 164, horizontal axis 161 represents common mode voltage in volts, and vertical axis 163 represents normalized modified neutral point current $i^*_{np}/i^*_{peak}$, where $i_{peak}$ is the peak neutral point current. In one embodiment, the vertical axis may directly be represented with only modified neutral point current. Plot 160 is for phase angle 209.7°, plot 162 is for phase angle 59.7° and plot 164 is for phase angle 149.7°. It can be seen from plots 160 and 162 that for a desired amount of modified neutral point current $i^*_{np}$ 165, there exists only one solution 166 and 167 respectively. Further, it can be seen from plot 164 that there are two solutions 168 and 169 for the desired amount of modified neutral point current 165. All the solutions 166, 167, 168 and 169 fall within the three limits: minimum $u^*_{cm,\,min}$, medium $u^*_{cm,\,med}$, and maximum $u^*_{cm,\,max}$ respectively. The exact value of the desired common mode voltage is then found from slope of the curve between minimum voltage and medium voltage and medium voltage and maximum voltage with respect to neutral point current. In one embodiments, all the common mode voltage values for a given power factor or the phase angle and the neutral point current are stored in a lookup table. As described earlier, if there are two solutions as in plot 164 then the one with lower magnitude is selected. Thus, in plot 164, solution 168 which has lower magnitude compared to solution 169 is selected.

Figure 8:
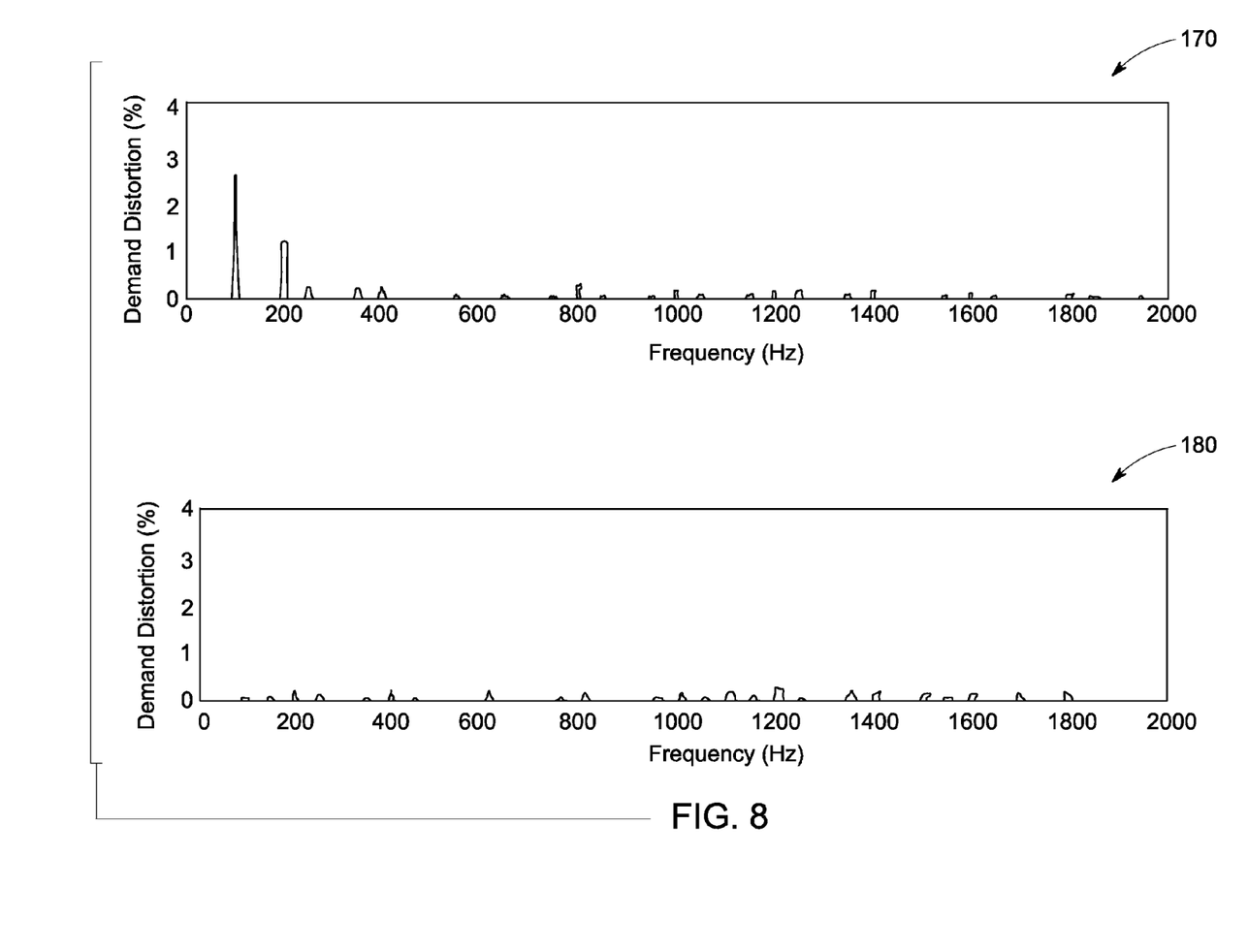
FIG. 8 is a graphical representation of output current total harmonic distortion simulation plots.

FIG. 8 shows simulation plots 170 and 180 for total harmonic distortion (THD) in output currents. Fast Fourier transform (FFT) plot 170 is for a multilevel converter operation without any NP controller whereas FFT plot 180 is for a multilevel converter operation with a NP controller as described herein. Both plots are for zero power factor. FFT plot 170 shows that $2^{nd}$ and $4^{th}$ harmonics have significant amplitudes whereas FFT plot 180 shows that the harmonics are well suppressed.

One of the advantages of the NP controller described herein is improved stability of three level converters even when operating at zero power factor. The NP controller further reduces the THD of output current and may reduce the cost of the DC link capacitors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system for controlling a multilevel converter, the control system comprising:
    a differential mode current regulator for generating reference voltage command signals based on a difference between reference current command signals and actual current command signals;
    a neutral point (NP) controller for determining a modified neutral point current signal in response to a DC link voltage unbalance and using the modified neutral point current signal to generate a common mode reference voltage signal; and
    a PWM controller for generating switching pulses for the multilevel converter based on the reference voltage command signals and the common mode reference voltage signal.

2. The control system of claim 1, wherein the reference current command signals comprise d-q domain reference current command signals and the reference voltage command signals comprise d-q domain reference voltage command signals.

3. The control system of claim 2 further comprising a DC link voltage regulator for generating the d-domain reference current command signal based on a difference between a reference DC link voltage signal and a desired DC link voltage signal and a reactive power regulator for generating the q-domain reference current command signal based on a difference between a reference reactive power signal and a desired reactive power signal.

4. The control system of claim 2 comprising transformation matrices for transforming the d-q domain reference current command signals into a-b-c domain reference current command signals and d-q domain reference voltage command signals into a-b-c domain reference voltage command signals.

5. The control system of claim 2, wherein the NP controller comprises a min-max classifier for determining instantaneous minimum, medium, and maximum voltage and current signals among reference current command signals and reference voltage command signals or among measured current command signals and reference voltage command signals.

6. The control system of claim 5, wherein the NP controller comprises an NP current pre-calculator for generating a neutral point current signal based on the instantaneous minimum, medium, and maximum voltage and current signals.

7. The control system of claim 6 further comprising a NP limit calculator for determining minimum and maximum limits for the neutral point current signal and the common mode reference voltage signal.

8. The control system of claim 7 further comprising a waveform corrector for generating the modified neutral point current signal based on the minimum and maximum limits for the neutral point current signal and a DC control signal.

9. The control system of claim 8, wherein the DC control signal is generated by a PI regulator based on a differential DC link voltage signal.

10. The control system of claim 8, wherein the modified neutral point current signal is equal to the neutral point current signal when the DC control signal is zero.

11. The control system of claim 7 further comprising a dynamic common mode (CM) voltage calculator for generating the common mode reference voltage signal based on the modified neutral point current and minimum and maximum limits for the neutral point current signal and the common mode reference voltage signal.

12. The control system of claim 11, wherein the dynamic CM voltage calculator comprises a look-up table for providing the CM reference voltage signal magnitude according to the modified current signal and a load power factor.

13. A method of controlling a multilevel converter comprising:
   (a) generating reference voltage command signals based on a difference between reference current command signals and actual current command signals;
   (b) in response to a voltage unbalance on a DC link of the multi-level converter,
      (i) using the reference voltage command signals and reference current command signals for generating a modified neutral point current signal to compensate for the DC link voltage unbalance;
      (ii) using the modified neutral point current signal for generating a common mode reference voltage signal; and
      (iii) generating switching pulses for the multilevel converter based on summation of reference voltage command signals and the common mode reference voltage signal.

14. The method of claim 13, wherein the reference current command signals comprise d-q domain reference current command signals and the reference voltage command signals comprise d-q domain reference voltage command signals.

15. The method of claim 14, wherein the d-domain reference current command signal is based on a difference between a reference DC link voltage signal and a desired DC link voltage signal and the q-domain reference current command signal is based on a difference between a reference reactive power signal and a desired reactive power signal.

16. The method of claim 14, wherein generating the modified neutral point current signal comprises modifying a neutral point current signal based on the minimum and maximum limits for the neutral point current signal and a DC control signal.

17. The method of claim 16, wherein the neutral point current signal is generated based on instantaneous minimum, medium, and maximum reference current command signals and reference voltage command signals.

18. The method of claim 16, wherein the DC control signal is generated by based on a differential DC link voltage signal.

19. The method of claim 13, wherein the common mode reference voltage signal is generated based on a load power factor and the minimum and maximum limits for the neutral point current signal and the common mode reference voltage signal.

20. A multilevel converter comprising:
   a plurality of phase legs each having at least two inner switching devices, at least two outer switching devices, at least two clamping diodes and a split DC link; and
   a control system for controlling the multilevel converter comprising
      a differential mode current regulator for generating reference voltage command signals based on a difference between reference current command signals and actual current command signals;
      a neutral point (NP) controller for determining a modified neutral point current signal in response to a DC link voltage unbalance and using the modified neutral point current signal to generate a common mode reference voltage signal; and
      a PWM controller for generating switching pulses for the multilevel converter based on the reference voltage command signals and the common mode reference voltage signal.

* * * * *

UNITED STATES PATENT AND TRADEMARK OFFICE
CERTIFICATE OF CORRECTION

PATENT NO. : 8,441,820 B2
APPLICATION NO. : 12/893015
DATED : May 14, 2013
INVENTOR(S) : Shen et al.

Page 1 of 1

It is certified that error appears in the above-identified patent and that said Letters Patent is hereby corrected as shown below:

In the Specifications:

In Column 5, Line 31, delete "MM-Max" and insert -- Min-Max --, therefor.

In Column 6, Line 6, in Equation (3), delete " $=\max(u_{max} - u^*_{DC,p} \cdot DC_{max}, (1-DC_{max}) \cdot u_{DC,p} +$ " and insert -- $=\max(u_{max} - u_{DC,p} \cdot DC_{max}, (1-DC_{max}) \cdot u_{DC,p} +$ --, therefor.

In Column 6, Line 8, in Equation (4), delete " $=\min(u_{min} - u^*_{DC,n} \cdot DC_{max}, (1-DC_{max}) \cdot u_{DC,n} +$ " and insert -- $=\min(u_{min} - u_{DC,n} \cdot DC_{max}, (1-DC_{max}) \cdot u_{DC,n} +$ --, therefor.

In Column 7, Line 40, delete " $i^*_{np}/i^*_{peak},$ " and insert -- $i^*_{np}/i_{peak},$ --, therefor.

Signed and Sealed this
Second Day of July, 2013

Teresa Stanek Rea
*Acting Director of the United States Patent and Trademark Office*